Sept. 3, 1935.  E. C. STEWART  2,013,451
METHOD OF FEEDING GLASS
Filed Feb. 2, 1933
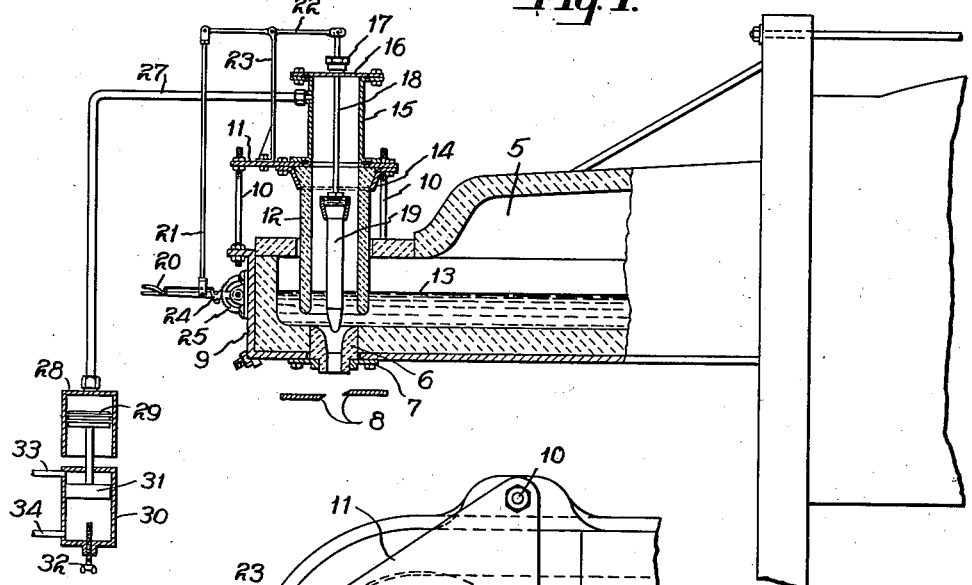
*Fig. 1.*
*Fig. 2.*
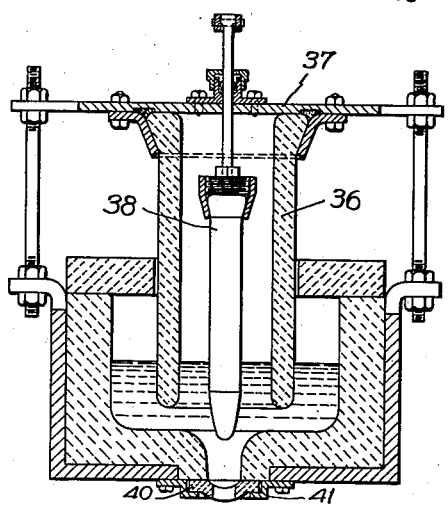
*Fig. 3.*
INVENTOR
Edward C. Stewart,
By Archworth Martin,
Attorney.

UNITED STATES PATENT OFFICE 2,013,451

METHOD OF FEEDING GLASS

Edward C. Stewart, Washington, Pa., assignor to Tygart Valley Glass Company, Washington, Pa., a corporation of West Virginia Application February 2, 1933, Serial No. 654,794

3 Claims. (Cl. 49—77)

My invention relates to the feeding of molten glass in the form of mold charges, and more particularly to that type known as air feeders.

In air feeders, it has been common practice to mount a bell in a furnace boot, above the orifice in the bottom of the boot, and to effect pulsations of air within the bell, to produce pressure and suction on the surface of the glass contained within the bell, and thereby impart extrusive and retractive impulses to glass, and control movement thereof through the feeding orifice.

In said type of feeder, adjustments to compensate for changes in temperature and viscosity of the glass, and for the purpose of varying the sizes of mold charges, are effected by raising and lowering the bell, or by varying the pressure and suction impulses within the bell, or both.

My invention has for one of its objects the provision of a means and method whereby little or no adjustment or change is necessary in the air supplied or in the positions of the bell.

Another object of my invention is to provide means for varying the quantity of glass which may enter the bell during each cycle of a feeding operation, without the necessity of raising or lowering the bell, and without making adjustments or changes in the air supply system.

Still another object of my invention is to provide a structure wherein a bell and a displacement valve are employed, both of which may be readily adjusted and are cooperatively related in such manner that desired sizes of mold charges can readily be produced, notwithstanding changes in temperature or viscosity of the glass, and can be produced with a minimum of cords resulting from a mixture of colder glass with glass of higher temperatures.

Some of the forms which my invention may take are shown in the accompanying drawing, wherein Figure 1 is a longitudinal sectional view through a portion of a glass furnace, and feeding apparatus employed in connection therewith; Fig. 2 is a plan view thereof, on an enlarged scale, and Fig. 3 is a cross-sectional view showing a modification of the structure of Fig. 1.

A glass furnace boot or forehearth is indicated by the numeral 5. An opening in the bottom of the boot contains a flow or orifice ring 6 that is detachably held in place by removable plates 7, in any well-known manner. Shears 8 are positioned beneath the orifice, and are operated in any well-known manner, in timed relation to the movement of a mold table which carries the molds to which charges of glass cut by the shears are dropped.

A metal shell or framework 9 extends around the forward end of the boot, and contains flanges that support rods 10, which at their upper ends carry a plate 11. The positions of the nuts on the rods 10 are changed in order to effect vertical adjustment of the plate 11 and thereby vary the distance which the clay tube 12 extends into the body of molten glass 13.

The clay tube constitutes in effect a portion of a bell, and is flanged or flared at its upper end so that it can be readily connected to the plate 11, as by a collar 14. The connection between the collar 14, the tube 12, and the plate 11 is made air-tight.

A metal shell 15 is secured to the upper side of the plate 11, and, together with the clay tube 12 forms in effect a bell. The upper end of the shell 15 is closed by a cover plate 16. The cover plate 16 has air-tight engagement with the upper end of the shell 15. The joints between the plates 11 and 16 and their associated members can be made air-tight, in any suitable manner, as by the use of iron cement which is applied in the form of paste, and becomes hardened. The metal members, and particularly the shell 15, are preferably made of an alloy steel which has great heat resistance.

A stuffing box 17 is mounted on the cover plate 16 and a lifting rod 18 extends through said stuffing box and the cover plate 16. Metal packing or the like can be employed in the stuffing box 17. The lower end of the lifting rod 18 is connected to a combined displacement member and valve 19 and can be lowered to completely close the orifice 6, or can be raised to permit glass to flow through said orifice. The rate at which glass flows through the orifice will depend somewhat upon the position of the member 19. Also, the position of the member 19 will determine the volume of molten glass contained within the bell when the glass in the bell is at the pool level. This is an important feature of my invention, since when extrusive impulses are imparted to the surface of the glass in the bell, the amount of glass forced through the orifice 6 will depend largely upon the volume of glass within the bell.

The vertical positioning of the member 19 is effected by means of a hand lever 20 acting through a link or pull rod 21 and a lever 22 that is pivotally supported on a bracket 23. The hand lever 20 can be maintained in any desired position by means of a pivoted pawl 24 carried thereby, that cooperates with a segmental rack 25 which is secured to the metal shell 9. It will be seen that if the handle 20 is moved downwardly from the position shown, the displacement member 19 will be raised further, so that a greater quantity of glass can enter the bell 12, because the tapered end of the member 19 will be raised further into the bell. A similar result would, of course, be obtained if the tapered portion of the member 19 were entirely cut away. Therefore, upon the application of air pressure as hereinafter explained, a greater quantity of glass will be extruded through the orifice than if the valve were in a lower position.

These vertical adjustments of the member 19 can be made when changing from molds of one size to molds of another size. Also, the member may be adjusted in order to compensate for slight variations in temperature and viscosity of the glass.

By avoiding constant reciprocation of the member 19 in the manner followed in connection with some previous types of feeders, I avoid the tendency to form cords or ream in the glass.

Where there are wide changes in the sizes of the glass charges which are to be supplied, or considerable change occurs in temperature of the molten glass, I will adjust the bell 12 vertically with respect to the orifice 10, as heretofore explained.

Pulsations of air within the bell 12 are effected through a pipe 27 that communicates with the shell 15 and with a pump cylinder 28. A piston 29 is reciprocated in the cylinder 28, by means of a fluid motor 30 which has a piston 31 directly connected to the piston 29. The length of stroke of the piston 31, and hence that of the piston 29 is controlled by an adjustable screw stop 32. Fluid is supplied to the cylinder 30 through pipes 33 and 34 from a suitable source, and control of pressure and exhaust through the pipes 33 and 34, to effect reciprocation of the piston 31, can be effected in various well-known ways, in timed relation to movement of the shears 8 and the mold table. The reciprocation of the piston 29, of course, effects pulsations in the air line 27, and in the bell 11 to impart extrusive and retractive impulses to the glass.

Referring now to Fig. 3, I show a structure quite similar to that of Fig. 1, but wherein the metal shell 15 is eliminated, by reason of the fact that the clay tube or bell 36 has direct connection with a top plate 37. The bell 36 and the displacement member 38 are adjustable in the same manner as are the bell 12 and the member 19 of Fig. 1.

A flow ring 40 is detachably maintained in place by a supporting plate or ring 41, and is more readily removed than is the ring 6. Furthermore in changing the flow rings in Fig. 4, the plunger 38 may be lowered to shut off flow through the bottom of the boot, while such change is being made.

The orifice ring or bushings 6 and 40 which are employed in connection with the apparatus may have their passageways of various sizes and of various contours. For example, on small ware, the bushing will have an orifice of smaller diameter than in the case of bushings which are employed in the making of larger sizes of ware.

For certain ware, the orifice will be of circular form, while in the forming of charges for molds, which are of oval or other non-circular form in cross section, the orifice of the flow ring can be correspondingly shaped in order that the contour of the mold charge may more closely conform to the contour of the mold, with consequent better distribution of the glass within the mold, when the charge is expanded, thereby producing articles of more uniform wall thickness than in the case of non-circular articles formed from circular mold charges.

I claim as my invention:—

1. The method of feeding charges of molten glass through an orifice in the lower wall of a receptacle, which comprises mounting a bell above and in proximity to the orifice and with its lower end extending into the glass, varying the effective volume of glass within the bell at points below the normal glass level therein while the bell is stationary, in accordance with desired changes in size of mold charges, and creating pneumatic impulses on the surface of the glass within the bell.

2. The method of feeding charges of molten glass through an orifice in the lower wall of a receptacle, which comprises mounting a bell above and in proximity to the orifice and with its lower end extending into the glass, changing the vertical position of the bell and independently varying the effective volume of glass within the bell at points below the normal glass level therein, in accordance with desired changes in size of mold charges, and creating pneumatic impulses on the surface of the glass within the bell.

3. The method of feeding molten glass through an orifice which is below and communicates with an air-confining enclosure, which comprises providing a constant supply of molten glass to said enclosure so as to normally cause the glass to reach a predetermined level therein, varying the volume of the glass in the enclosure, independently of changes in said level and in accordance with desired changes in the size of mold charges, and periodically creating pneumatic impulses on the surface of the glass within the enclosure.

EDWARD C. STEWART.